United States Patent [19]

Takeuchi

[11] 4,227,371
[45] Oct. 14, 1980

[54] AUTOMOTIVE BRAKE BOOSTER DEVICE
[75] Inventor: Hiroo Takeuchi, Ueda, Japan
[73] Assignee: Nissin Kogyo Kabushiki Kaisha, Ueda, Japan
[21] Appl. No.: 887,414
[22] Filed: Mar. 15, 1978
[30] Foreign Application Priority Data Dec. 24, 1977 [JP] Japan .................. 52/174854[U]

[51] Int. Cl.³ .................................... B60T 13/00
[52] U.S. Cl. .............................. 60/547 R; 91/32;
  91/369 B; 91/416; 91/417 R; 92/13.8
[58] Field of Search ............... 60/547, 552, 553, 554,
  60/593, 594; 91/6, 32, 369 B, 376, 416, 417;
  92/13.8

[56] References Cited
U.S. PATENT DOCUMENTS

| 2,531,705 | 11/1950 | Schultz | 60/594 |
| 3,312,147 | 4/1967 | Reichard | 60/547 |
| 3,358,449 | 12/1967 | Brown | 60/552 |
| 3,423,937 | 1/1969 | Wagstaffe | 60/594 |

FOREIGN PATENT DOCUMENTS 2208755 9/1972 Fed. Rep. of Germany ............. 60/547

Primary Examiner—Abraham Hershkovitz
Attorney, Agent, or Firm—Haseltine, Lake & Waters

[57] ABSTRACT

A vacuum type brake booster device including an input rod with an adjustable stop mechanism for enabling the input rod to have such a normal, full-retracted position as to hold the booster control valve in a neutral position to keep the second working chamber of the booster out of communication with the first working chamber thereof as well as with the atmosphere while holding the booster output rod in direct abutting engagement with the brake master cylinder piston. There is no delay in operation of the brake master cylinder when the brake pedal is depressed.

6 Claims, 4 Drawing Figures

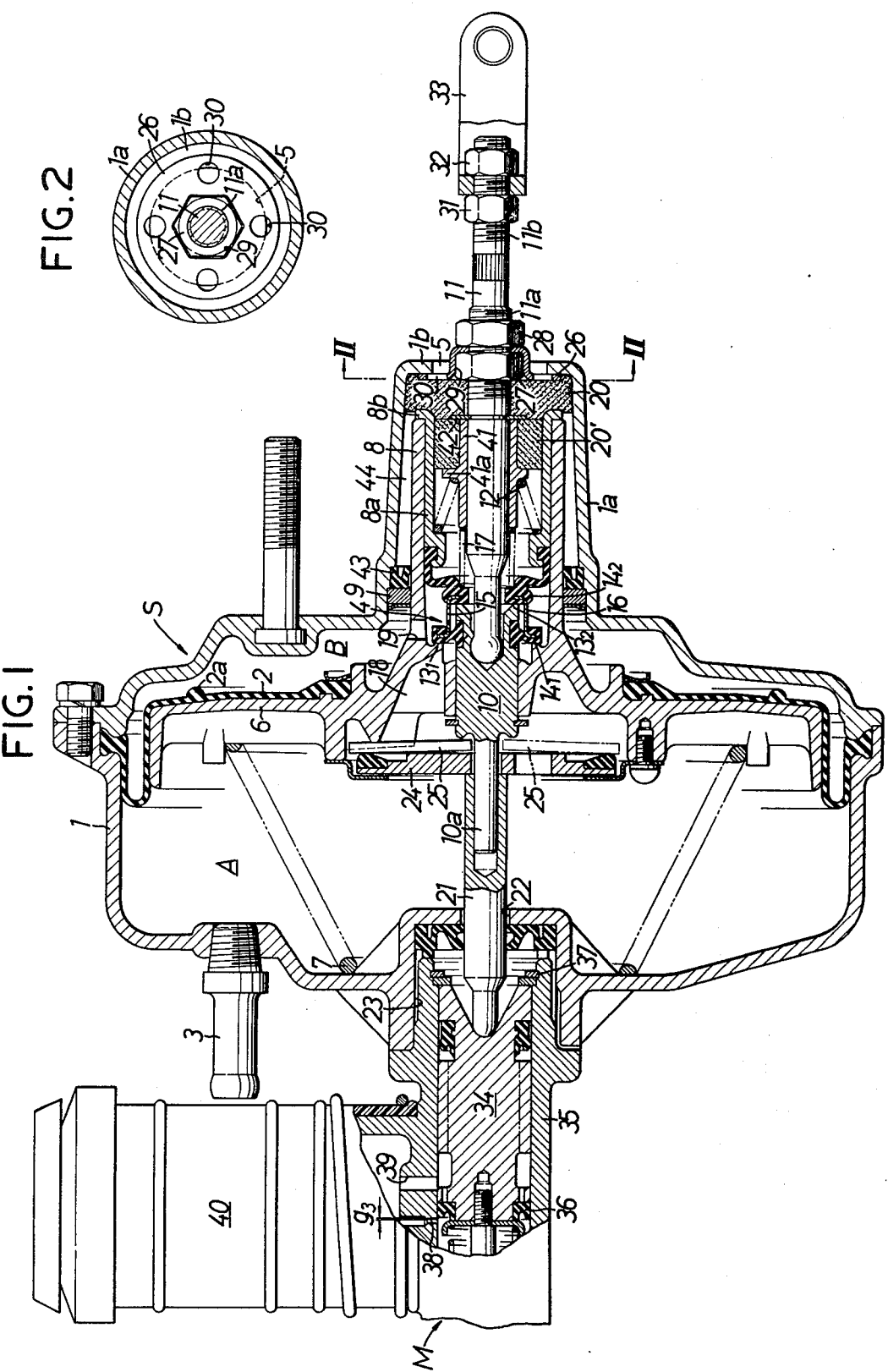

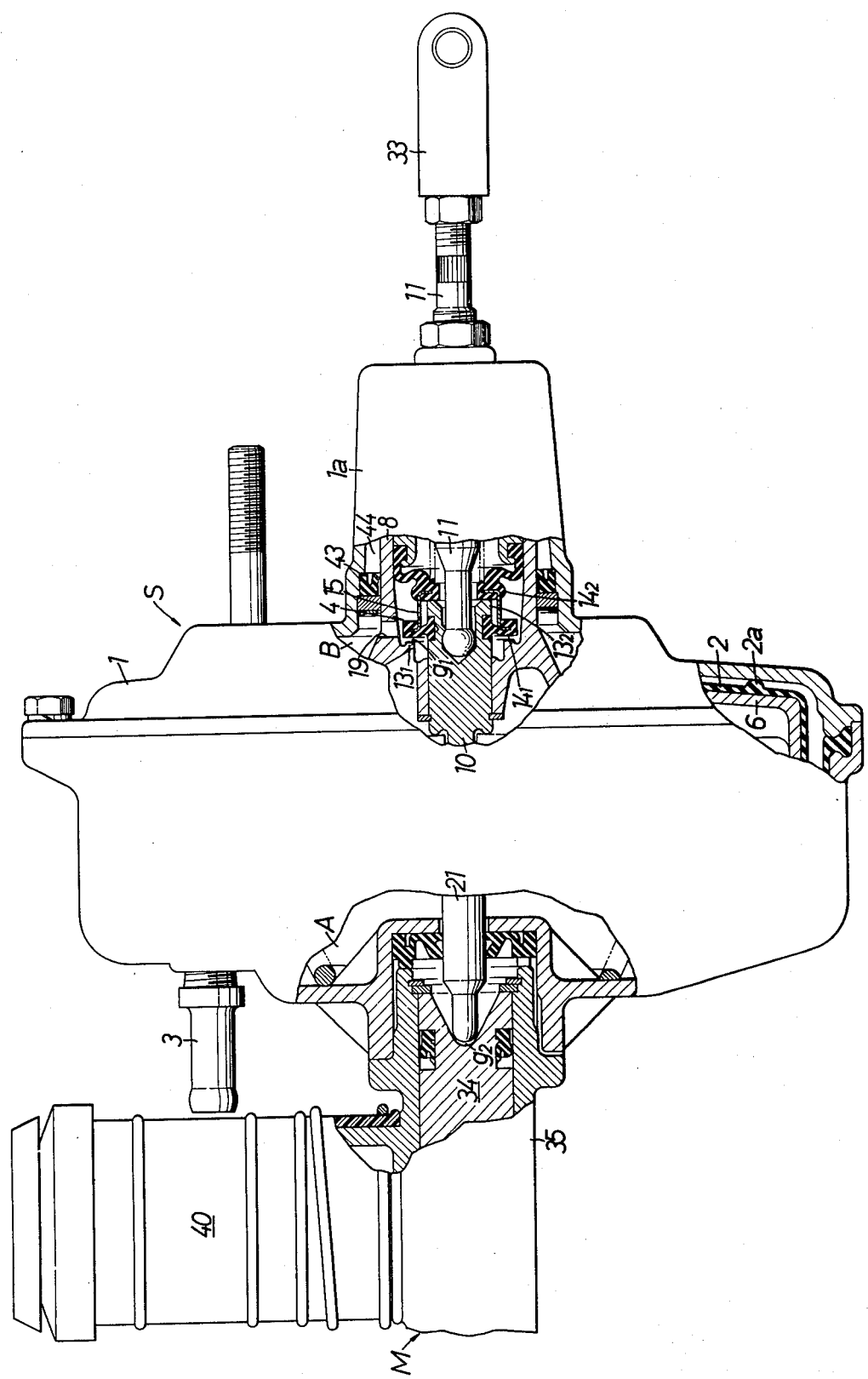

AUTOMOTIVE BRAKE BOOSTER DEVICE

BACKGROUND OF THE INVENTION

This invention relates to automotive brake booster devices and more particularly to those of the type including a booster shell, a booster piston accommodated in the booster shell, a first working chamber defined in the booster shell by the booster piston on the front side thereof and continuously held in communication with a source of vacuum supply, a second working chamber defined in the booster shell by the booster piston on the rear side thereof and adapted to be selectively placed in communication with the first working chamber and the external atmosphere by a control valve, an input rod connected with a brake pedal and arranged opposite to the booster piston for movement toward and away from the latter, said control valve being arranged between the input rod and the booster piston and operable upon forward movement of the input rod to produce such a pressure differential between the first and second working chambers as to cause the booster piston to follow the movement of the input rod, and an output rod operatively connected with the booster piston for driving engagement with the operating piston of a brake master cylinder.

Conventionally, in this type of brake booster device, provision has been made to enable the master cylinder piston to restore its proper retracted position by arranging so that, when the booster input rod is in its full-retracted position, the booster output rod and the master cylinder piston are held with a small axial clearance or gap left therebetween which is sufficient to accommodate machining errors on the associated parts. Also, provision has been made to ensure that, in the released state of the booster device, the booster piston is maintained in its predetermined, retracted position, by arranging so that, in the booster state, the control valve is held in a normal state switched to place the second booster chamber in communication with the first booster chamber. In such booster device, when the input rod is advanced forwardly from its normal, retracted position, the control valve is switched from its normal, retracted state to its operative state to start the booster piston forwardly. On this occasion, however, the operation piston of the brake master cylinder remains inoperative until the booster output rod is brought into abutting engagement therewith. The distance of advancing movement of the booster input rod effected by this time represents a lost motion or an idle range of advancing stroke of the input rod which has no effect on the booster piston. This obviously calls for a corresponding considerable increase in initial, idle travel of the brake pedal, which is actuated with a substantial lever ratio, giving rise to an undesirable delay in operation of the brake master cylinder.

SUMMARY OF THE INVENTION

The present invention seeks to overcome the difficulties previously encountered in the art as described above and has for its primary object the provision of a new and improved automotive brake booster device of the type described which comprises adjustable stop means for limiting the extent of retracting movement of the booster input rod in such a manner that, when the latter is released to its normal, full-retracted position, the control valve assumes a neutral position to keep the second working chamber out of communication with the first working chamber as well as with the external atmosphere while holding the booster output rod in abutting engagement with the brake master cylinder piston.

The above and other objects, features and advantages of the present invention will become apparent from the following description when taken in conjunction with the accompanying drawings, which illustrate a few preferred embodiments of the invention.

BRIEF DESCRIPTION OF THE DRAWINGS

In the drawings:

FIG. 1 is a longitudinal cross-sectional view in side elevation illustrating a preferred form of brake booster device embodying the present invention;

FIG. 2 is a cross section taken along the line II—II in FIG. 1;

FIG. 3 is a partly cutaway side elevational view, showing the device of FIG. 1 in its state assumed before the rear limit of stroking movement of the input rod is reached.

DESCRIPTION OF THE PREFERRED EMBODIMENTS

Figure 4:
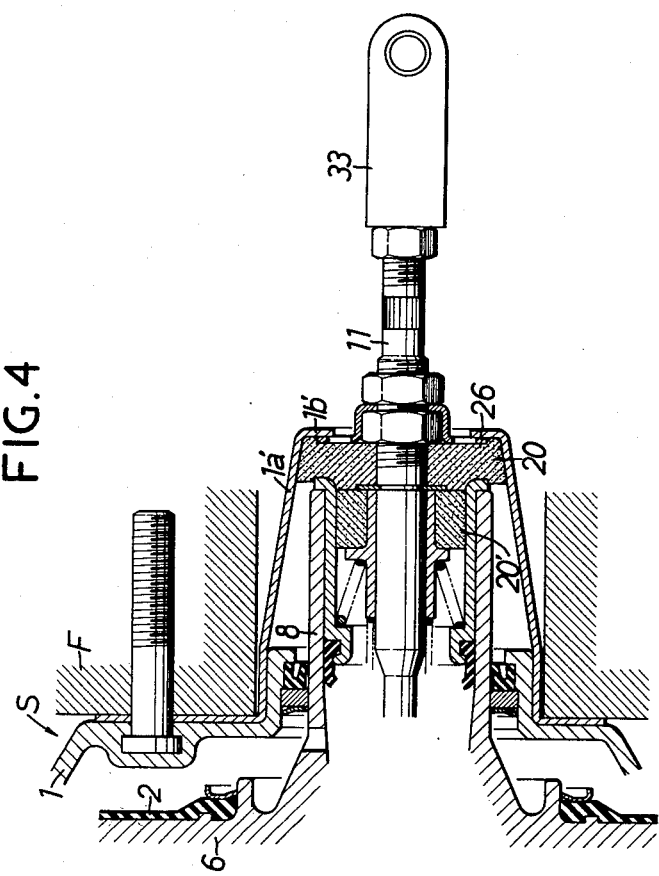
FIG. 4 is a fragmentary longitudinal cross section of another preferred form of booster device embodying the present invention.

Referring to the drawings and first to FIG. 1, reference character S generally indicates a vacuum type brake booster device embodying the principles of the present invention. The booster device S includes a booster shell 1 and a booster piston 6 accommodated therein. The interior space of the booster shell 1 is divided by the piston 6, with a diaphragm 2 joined to the rear face thereof, into first and second working chambers A and B respectively defined at the front and rear sides of the booster piston 6. The first working chamber A is continuously held in communication with a source of vacuum supply in the form of an intake manifold, not shown, of the associated internal combustion engine by way of a vacuum inlet pipe 3. The second working chamber B is selectively placed in communication with the first working chamber A and the external atmosphere under the control of a control valve 4, which will be described later in detail, the external atmosphere being admitted through an air inlet bore 5 formed in the rear end wall 1b of a tubular covering or housing 1a, which is formed, in this embodiment, integral with the booster shell 1 and extends rearwardly from the rear face thereof.

The booster piston 6 is normally biased rearwardly by a restoring spring 7 arranged under compression in the first working chamber A. The rearward travel of the booster piston 6 under the spring bias is limited by an annular stop rib 2a formed on the rear surface of the diaphragm 2 for abutting engagement with the rear wall of the booster shell 1.

Formed integrally with the booster piston 6 is a tubular valve casing 8 which extends rearwardly from the booster piston 6 coaxially therewith and is slidably supported by a plain bearing 9 fitted in the tubular housing 1a. As shown, a seal ring 43 is arranged adjacent to the plain bearing 9 on the rear side thereof. Inserted in the valve casing 8 axially thereof is an input rod 11 at the forward end of which is connected a control piston 10 which is slidably fitted in the booster piston 6 coaxially therewith. Reference numeral 12 designates a restoring spring arranged to normally bias the input rod 11 rearwardly and the rearward travel of the input rod 11 under the spring bias is limited by a stop plate 26 mounted thereon in the manner described hereinafter for abutting engagement with the inner surface of the rear end wall 1b of tubular covering 1a.

The input rod 11 has a threaded intermediate portion 11a and a threaded rear end portion 11b. A pair of front and rear threaded nuts 27 and 28 are threadably fitted on the threaded intermediate portion 11a to clamp the stop plate 26 therebetween. The stop plate 26 is formed at its center with a hexagonal-shaped recess 29 in which the front nut 27 is engaged. With this arrangement, it will be seen that, once the rear nut 28 has been loosened, the axial position of the stop plate 26 mounted on the input rod 11 can be readily adjusted relative thereto merely by turning the stop plate 26 as desired since simultaneously with this the front nut 27 is turned about the intermediate threaded portion 11a of input rod 11 and thus is axially moved relative thereto. Vent holes 30 are formed in the stop plate 26 so as to communicate with the air inlet bore 5 in the rear end wall 1b of tubular covering 1a.

Also, a pair of front and rear nuts 31 and 32 are threadably fitted on the threaded rear end portion 11b of input rod 11 to clamp a pedal link 33 therebetween, which is connected with a brake pedal, not shown. Obviously, the pedal link 33 can be adjusted back and forth relative to the input rod 11 in substantially the same manner as the stop plate 26.

The control valve 4 is constructed within the tubular valve casing 8 as follows: Formed on the inside of the front wall of valve casing 8 is a first valve seat $13_1$ which encircles the control piston 10 in radially spaced relation thereto. Reference numeral $13_2$ designates a second valve seat formed on the control piston 10 at the rear end thereof.

Reference numerals $14_1$ and $14_2$ respectively designate a first and a second flexible valve element, the movable end portions of which are held opposite to the first and second valve seats $13_1$ and $13_2$, respectively. The base end portion of the first valve element $14_1$ is fixed to the periphery of control piston 10 while that of the second valve element $14_2$ is fixed to the outer periphery of an inner tube or sleeve 8a at the front end thereof, which is fitted in the tubular valve casing 8. The movable end portions of the first and second valve elements $14_1$ and $14_2$ are interconnected by means of an annular rigid member 16 which has a through hole 15 formed in the peripheral wall thereof. The movable end portion of second valve element $14_2$ is normally biased toward the second valve seat $13_2$ by a valve spring 17 provided therefor. As shown, the space radially inside of the first valve seat $13_1$ is in constant communication with the first working chamber A by way of a cavity 18 formed in the booster piston 6. The space in the valve casing 8 around the first and second valve seats $13_1$ and $13_2$ is in communication with the second working chamber B through a radial hole 19 formed in the wall of the tubular valve casing 8 and with the air inlet bore 5 through the space inside sleeve 8a.

Fitted over the input rod 11 is a tubular spring support 41 which has a radially outwardly extending annular flange portion 41a formed midway of the axial length thereof and is supported at the rear end by a retainer ring 42 fixedly mounted on the input rod 11. The valve spring 17 is arranged under compression between the front end face of spring support 41 and the movable end portion of second valve element $14_2$ while the restoring spring 12 for the input rod 11 is arranged under compression between the flange portion 41a of spring support 41 and a front end portion of sleeve 8a. As shown, the sleeve 8a is formed at its rear end with a radially outwardly extending annular flange 8b and the restoring spring 12 for the input rod 11 also serves to resiliently hold the sleeve flange 8b in abutting engagement with the rear end face of the tubular valve casing 8.

An annular air filter element 20 is fitted between the rear end flange 8b of sleeve 8a and the stop plate 26 in close contacting relation with the outer peripheral surface of input rod 11 and the inner peripheral wall surface of tubular housing 1a. Another annular air filter element 20' is fitted between the radial flange portion 41a of tubular spring support 41 and the retainer ring 42 with the inner and outer peripheral surfaces of the filter element 20' held in close contact with the outer peripheral surface of spring support 41 and the inner peripheral surface of sleeve 8a, respectively. The two air filter elements 20 and 20' are both made of a highly resilient filter material such as urethane foam.

Projecting axially and forwardly from the front end of the control piston 10 is a stem 10a of reduced diameter which is fitted in the rear end portion of an output rod 21 for free sliding movement relative thereto. The output rod 21 has its forward end portion extended through an axial hole 22, formed in the front wall of booster shell 1, into a housing recess 23 formed in the booster shell 1 on the front side thereof. Also, the output rod 21 is held at its rear end in abutting engagement with a reaction plate 24 which is loosely fitted over the reduced-diameter stem portion 10a of control piston 10. A plurality of reaction levers 25 are radially arranged, as shown, between the reaction plate 24 and the booster and control pistons 6 and 10.

The body 35 of a brake master cylinder M is fitted at the rear end into the recessed housing portion 23 of the booster shell 1, with a seal member interposed between the rear end face of the cylinder body 35 and the adjacent end wall of the housing 23 and slidably fitted over the output rod 21 in sealing relation thereto.

The brake master cylinder M is of a conventional structure, including an operating piston 34 slidably fitted in the cylinder body 35 so as to be actuated by the output rod 21 of the booster device S, a piston cup 36, a stop ring 37 for limiting the retracting movement of operating piston 34, and vent and replenishing ports 38 and 39 providing intercommunication between the oil space in the cylinder body 35 and an oil reservoir 40 mounted thereon.

Description will next be made of the operation of the embodiment described above.

First, when in the assembling stage the brake master cylinder M and the brake booster device S have been joined together, it is usual that, as shown in FIG. 3, the booster piston 6 lies in its full-retracted position with the stop rib 2a held in abutting engagement with the rear wall surface of the booster shell 1 and axial gaps $g_1$ and $g_2$ are defined respectively between the first valve seat $13_1$ and first valve element $14_1$ and between the master cylinder piston 34 and booster output rod 21.

In the device of the present invention, however, the gaps $g_1$ and $g_2$ can be eliminated conveniently in the following manner: First, the vacuum inlet pipe 3 is connected to the source of vacuum supply to apply a vacuum to the first working chamber A and, under this condition, the clamp nuts 27 and 28 on the input rod 11 are adjusted in the manner previously described to gradually shift the stop plate 26 rearwardly relative to the input rod 11. This causes the input rod 11 to move gradually forward under the reaction with the stop plate 26 thereby to eliminate the gaps $g_1$ and $g_2$. Subsequently, the stop plate 26 is fixed in the axial position adjusted relative to the input rod 11 by means of clamp nuts 27 and 28.

In such stop-adjusting procedure, as the input rod 11 is advanced relative to the stop plate 26 and hence to the tubular covering 1a, the first valve element $14_1$ is seated against the first valve seat $13_1$ and then the second valve seat $13_2$ is separated from the second valve element $14_2$. In this manner, the second working chamber B is placed out of communication with the first working chamber A while being placed in communication with the air inlet bore 5 in the end wall of tubular covering 1a by way of radial hole 19 and through hole 15 and fed with clean atmospheric air as filtered by the air filter elements 20 and 20′. As a consequence, there arises a pressure differential between the first and second working chambers A and B which causes the diaphragm 2 and booster piston 6 to advance against the bias of restoring spring 7 and thus act to drive the output rod 21 forwardly through the intermediary of reaction levers 25 and reaction plate 24 into direct abutting engagement with the operating piston 34 of brake master cylinder M. At this point, the stop plate 26 on the input rod 11 is fixed thereto to hold the latter against any further advancing movement, and now the second valve element $14_2$ under the forward bias of valve spring 17 overtakes the second valve seat $13_2$ to seat thereon, as shown in FIG. 1. It is to be noted that in this manner the control valve 4 is placed in a neutral state to keep the second working chamber B out of communication with the first working chamber A as well as with the external atmosphere. In this state, if there is a pressure differential between the first and second chambers A and B larger than the biasing force of the spring 7, the piston 6 tends to advance under such pressure differential against the action of the spring 7 so that the pressure in the second chamber B leaks through the gap between the first valve seat 13 and the first valve element 14 into the first chamber A to thereby establish an equilibrium between the biasing force of the spring 7 and the differential pressure between the chambers A and B, allowing the booster piston 6 to stand still while holding the output rod 21 in abutting engagement with the brake master cylinder piston 34. As will be readily noted, in this condition, the rest position of the input rod 11 represents the rear limit of its retracting stroke in normal brake operation.

Incidentally, in cases where, in the brake master cylinder M, the axial spacing or gap $g_3$ between the piston cup 36 and vent port 38 is of a magnitude larger than needed on account of machining errors, such gap $g_3$ can be properly reduced by adjusting the position of the stop plate 26 mounted on the input rod 11 to further advance the latter and hence the master cylinder piston 34 by an appropriate distance.

Once the rear stroke limit or full-retracted position of input rod 11 has been properly adjusted as described above, the second valve seat $13_2$ is separated from the associated, second valve element $14_2$ at the instant when the brake pedal, not shown, is depressed and the input rod 11 advanced in order to activate the brake system of the associated vehicle. Thus, atmospheric air is introduced into the second working chamber B without delay upon depression of the brake pedal and the booster piston 6 is advanced under the pressure differential arising between the first and second working chambers A and B. Simultaneously with this, the output rod 21 is driven forwardly, which is already in abutting engagement with the brake master cylinder piston 34. It will be noted, therefore, that the brake master cylinder M can operate upon depression of the brake pedal without any delay. In the brake operation, the force of thrust of the output rod 21 is partly fed back through reaction levers 25 and control piston 10 to the input rod 11 so that the driver can feel the magnitude of the output thrust from the force of reaction transmitted to the brake pedal being depressed.

Subsequently, when the brake pedal is released, which has operated the brake master cylinder M by way of the control valve 4 held in its neutral state effective to keep the second working chamber B out of communication with the first working chamber A as well as with the external atmosphere, the input rod 11 is retracted under the force of reaction acting on the control piston 10 and the biasing force of restoring spring 12 to return to its normal, full-retracted position as the stop plate 26 is brought into abutting engagement with the rear end wall 1b of tubular covering 1a. Simultaneously with this, control piston 10 is moved together with the refracting input rod 11 so that the first valve element $14_1$ is moved away from the first valve seat $13_1$ to place the two working chambers A and B in communication with each other and the pressure differential between the two chambers is eliminated to allow the booster piston 6 to retract under the bias of restoring spring 7. When the booster piston reaches a point in which the first valve seat 13 is in abutting engagement with the first valve element 14 to thereby place the control valve 4 in its neutral state, the chambers A and B come out of communication with each other so that the booster piston 6 is stopped in its retracting movement and thus restored to its fully retracted position by spring 7, allowing the output rod 21 and master cylinder piston 34 to return to the initial position before the depression of the brake pedal.

In this connection, the hollow space 44 surrounded by the tubular covering 1a, tubular valve casing 8, seal ring 43 and air filter 20 varies in volume with the back and forth movement of booster piston 6, breathing through the air inlet bore 5, vent holes 30 and air filter 20. It will thus be readily noted that the air filter 20 serves effectively to clean the atmospheric air as drawn into the hollow space 44 and, in cooperation with the seal ring 43, prevents ingress of any dust to the sliding region of the valve casing 8 and plain bearing 9.

FIG. 4 illustrates another embodiment of the present invention which is substantially the same in construction as the one previously shown and described except that it includes a tubular press-formed member 1a′ in place of the tubular covering 1a formed integrally with the booster shell 1 in the previous embodiment. As shown, the tubular member 1a′ is clamped between the booster shell 1 and that portion, F, of the automotive body on which the booster shell 1 is mounted and has an integral end wall 1b′ for abutting engagement with the stop plate 26.

To summarize, according to the present invention, the input rod 11 is made adjustable in its normal, full-retracted position relative to the booster shell and, with the input rod properly adjusted, the control valve 4 is held in its neutral state while at the same time the output rod 21 is held in direct abutting engagement with the operating piston 34 of the brake master cylinder M so that the booster piston 6 and master cylinder piston 34 can be actuated without any time delay upon advancing movement of the input rod 11 from its full-retracted position. This means that there is no lost motion or ineffective range of movement of the input rod and the response characteristic of the brake master cylinder M is substantially improved.

According to further aspects of the present invention, the tubular valve casing 8 formed integrally with the booster piston 6 is enclosed in the tubular covering 1a, which extends rearwardly from the booster shell 1 and serves to slidably support the valve casing 8 through the intermediary of plain bearing 9, so that the sliding peripheral surface of the valve casing 8 is always guarded against any mechanical damage from external objects by the tubular covering 1a. Further, the air filter 20, inserted between the stop plate 26 and tubular valve casing 8 in close contact with the periphery of input rod 11 and with the inner peripheral wall surface of tubular covering 1a (1a'), effectively serves the function of cleaning atmospheric air introduced into the booster shell 1 and that drawn into the tubular covering 1a (1a'). As will readily be appreciated, this arrangement is advantageously effective to prevent wear of parts and their malfunction as otherwise resulting from ingress of dust, while simplifying the structure of the booster device.

While a few embodiments of the present invention have been shown and described, it will be apparent to those skilled in the art that various changes and modifications may be made therein without departing from the spirit of the invention or the scope of the appended claims.

What is claimed is:

1. An automotive brake booster device of the type including a booster shell, a booster piston slidably accommodated in the booster shell, a first working chamber defined in the booster shell by the booster piston on the front side thereof and continuously held in communication with a source of vacuum supply, a biasing means for urging the booster piston in a retracting direction, a second working chamber defined in the booster shell by the booster piston on the rear side thereof, an input rod connected with a brake pedal and arranged opposite the booster piston for movement toward and away from the latter, control valve means for selectively placing the second working chamber in communication with the first working chamber and the external atmosphere, said control valve means being arranged between said input rod and said booster piston and being operable upon forward movement of the input rod to produce a pressure differential between the first and second working chambers which is effective to cause the booster piston to follow the movement of the input rod, and an output rod operatively connected with the booster piston and held in a position opposite the operating piston of a brake master cylinder, said device comprising adjustable stop means for limiting the extent of retracting movement of the input rod in such a manner that, with the input rod fully retracted, said control valve means is held in a neutral position to keep the second working chamber out of communication with the first working chamber as well as with the external atmosphere while the output rod is held in direct abutting engagement with the operating piston of the brake master cylinder.

2. A device as set forth in claim 1, in which said control valve means includes a tubular valve casing formed integrally with the booster piston and extending rearwardly therefrom, and which further comprises a tubular housing arranged on the rear face of the booster shell so as to cover said tubular valve casing and slidably support the latter, said tubular housing having a rear end wall provided with an air inlet bore therein, said adjustable stop means including a stop plate axially adjustably secured to the input rod for abutting engagement with the inside face of said rear end wall to limit the extent of retracting movement of the input rod.

3. A device as set forth in claim 2, further comprising an air filter inserted between the stop plate and the adjacent end face of the tubular valve casing and held in contact with the peripheral surface of the input rod and the inner peripheral wall surface of the tubular housing.

4. A device as set forth in claim 3 wherein said stop plate is provided with holes in communication with said air inlet bore.

5. A device as set forth in claim 2 wherein said input rod includes a threaded portion, said adjustable stop means further including two threaded elements on said threaded portion of said input rod sandwiching said stop plate therebetween.

6. A device as set forth in claim 5 wherein said stop plate is cup-shaped and receives one of said threaded elements therewithin.

* * * * *